US011161137B2

(12) United States Patent
Duong et al.

(10) Patent No.: US 11,161,137 B2
(45) Date of Patent: Nov. 2, 2021

(54) SPRINKLER WITH LOCKING MECHANISM AND REMOVABLE NOZZLE STRIP

(71) Applicant: Ningbo Yilin Aguatech Co., Ltd., Ningbo (CN)

(72) Inventors: Ha V. Duong, Winchester, VA (US); Hecheng Zhou, Zhejiang (CN); Chunfu Zhou, Zhejiang (CN); Robert William Lauer, Charlotte, NC (US)

(73) Assignee: Ningbo Yilin Aquatech Co., Ltd.

( * ) Notice: Subject to any disclaimer, the term of this patent is extended or adjusted under 35 U.S.C. 154(b) by 0 days.

(21) Appl. No.: 16/141,021

(22) Filed: Sep. 25, 2018

(65) Prior Publication Data

US 2020/0094284 A1    Mar. 26, 2020

(51) Int. Cl.
*B05B 15/00* (2018.01)
*B05B 15/652* (2018.01)
*B05B 3/04* (2006.01)
*B05B 3/02* (2006.01)
*A01G 25/02* (2006.01)

(52) U.S. Cl.
CPC ........... *B05B 15/652* (2018.02); *B05B 3/044* (2013.01); *A01G 25/02* (2013.01); *B05B 3/021* (2013.01)

(58) Field of Classification Search
CPC ......... B05B 3/044; B05B 1/20; B05B 15/652; B05B 3/21; A01G 25/02
USPC .......................... 239/255, 548, 550, 562, 566
See application file for complete search history.

(56) References Cited

U.S. PATENT DOCUMENTS

| 5,350,115 A * | 9/1994 | Burnworth | B05B 3/044 239/242 |
| 6,135,356 A * | 10/2000 | Mitzlaff | B05B 3/044 239/1 |
| 7,389,950 B2 | 6/2008 | Lo | |
| 7,607,590 B2 | 10/2009 | Nies | |
| 7,909,266 B2 | 3/2011 | Lo | |
| 8,534,573 B2 | 9/2013 | Wang et al. | |
| 9,764,338 B2 * | 9/2017 | Wang | B05B 15/68 |
| 2009/0200391 A1 | 8/2009 | Yehuda | |
| 2011/0248102 A1 * | 10/2011 | Wang | B05B 3/00 239/562 |
| 2018/0178238 A1 * | 6/2018 | Farra | B05B 3/044 |

* cited by examiner

*Primary Examiner* — Qingzhang Zhou (57) ABSTRACT

A sprinkler includes a body having an upper portion removably attached to a lower portion. The upper portion includes a nozzle strip and lower nozzle plate. The lower portion includes a hollow body, a locking plate, and a controller connected to the locking plate. The locking plate is configured to move in a lengthwise direction. The locking plate includes a locking plate tab and a locking plate groove. The lower nozzle plate includes a nozzle plate tab. The hollow body comprises a vertical channel configured to accommodate the locking plate tab in a first position. The nozzle plate tab is arranged beneath the locking plate tab in the first position. The locking plate tab is arranged outside the vertical channel in a second position. The controller is configured to move the locking plate to the first position and to the second position to facilitate removal of the upper portion.

11 Claims, 12 Drawing Sheets

$\theta_A > \theta_B > \theta_C > \theta_D > \theta_E > \theta_F > \theta_G > \theta_H > \theta_I > \theta_J$

SPRINKLER WITH LOCKING MECHANISM AND REMOVABLE NOZZLE STRIP

FIELD OF THE INVENTION

The present disclosure relates to a lawn sprinkler designed to facilitate easy disassembly for the purposes of accessing and removing a nozzle strip.

BACKGROUND OF THE INVENTION

Today's market includes sprinklers having a base frame, oscillator, and a tubular element containing a plurality of holes through which water is discharged. The oscillator drives the tubular element to oscillate back and forth, thereby watering a desired area of lawn. Furthermore, the oscillatory angle of these sprinklers is often adjustable, providing a way for varying the sprinkling area in the vertical direction.

Today's market also includes sprinklers that vary the sprinkling area in the horizontal direction. A conventional oscillating sprinkler is disclosed in U.S. Pat. No. 7,607,590 (the '590 patent), which describes an oscillating sprinkler, wherein an axis of at least some of a plurality of nozzles may be varied by control of an adjustment tab that is located at a center of a rotatable pivot plate and pivots the pivot plate in a circumferential direction with respect to a longitudinal direction of the sprinkler housing. Another conventional sprinkler is disclosed in U.S. Pat. No. 7,909,266 (the '266 patent), which describes an oscillating sprinkler having two adjustment plates rotatably mounted on a hollow tube. Each of the adjustment plates has two control members on two sides thereof so as to pivot the adjustment plate in a circumferential direction with respect to the hollow tube. Another conventional oscillating sprinkler is disclosed in U.S. Pat. No. 8,534,573 (the '573 patent), which describes individually manufactured nozzles that can be bent by actuation of a control wheel pivotally coupled to a regulating panel via a transmission rod. Yet another conventional oscillating sprinkler is disclosed in U.S. Pat. No. 9,764,338 (the '338 patent), which describes a control part and adjustment piece formed together as one unit on an end of the adjustment piece and also arranged inside a tubular structure.

SUMMARY OF THE INVENTION

One drawback with the conventional sprinklers is that they do not allow for easy to a nozzle assembly for cleaning and maintenance purposes. Another drawback is that the conventional designs utilize multiple adjusting mechanisms, which lead to more parts, thereby increasing the complexity of the design, and the manufacturing and assembly costs.

Thus, a need was felt for a sprinkler designed with a nozzle assembly that can be easily removed from the sprinkler for cleaning and maintenance purposes, along with lower manufacturing and assembly costs. Also, a need was felt for a sprinkler designed with a control knob that allows for easy and quick adjustment, along with lower manufacturing and assembly costs.

The sprinkler is designed to control a watering pattern by manipulating one or more control members positioned on opposite ends of the sprinkler that are designed to individually engage with a separate flat angle plate positioned inside the sprinkler. One advantage is ease of control. Another advantage is simplified manufacturing of the angle plate. The sprinkler is also designed with a locking mechanism that allows for easy access to the nozzle strip without sacrificing integrity of the sprinkler. One advantage is it allows for easy access to the nozzle strip for cleaning and replacement purposes (for example, due to wear-and-tear, hard water deposits, etc.), without having to damage or destroy the sprinkler.

According to a first aspect of the present disclosure, a sprinkler includes a body having an upper portion and a lower portion. The lower portion is removably attached to the upper portion. The upper portion includes a nozzle strip and a lower nozzle plate. The lower portion includes a hollow body, a locking plate, and a controller connected to the locking plate. The locking plate is configured to move in a lengthwise direction. The locking plate includes a locking plate tab and a locking plate groove. The lower nozzle plate includes a nozzle plate tab. The hollow body comprises a vertical channel formed therein, the vertical channel configured to accommodate the locking plate tab in a first position. The nozzle plate tab is arranged beneath the locking plate tab in the first position. The locking plate tab is arranged outside the vertical channel in a second position. The first position is a lock position and a second position an unlock position. The controller is connected to one side of the locking plate and is configured to move the locking plate to the first position (lock) and to the second position (unlock) to allow for detaching the upper portion from the lower portion of the sprinkler.

BRIEF DESCRIPTION OF THE DRAWINGS

The present invention is illustrated by way of example and not limited in the figures of the accompanying drawings in which like references indicate similar elements.

DETAILED DESCRIPTION

All identically numbered reference characters correspond to each other so that a duplicative description of each reference character in the drawings may be omitted.

Figure 1:
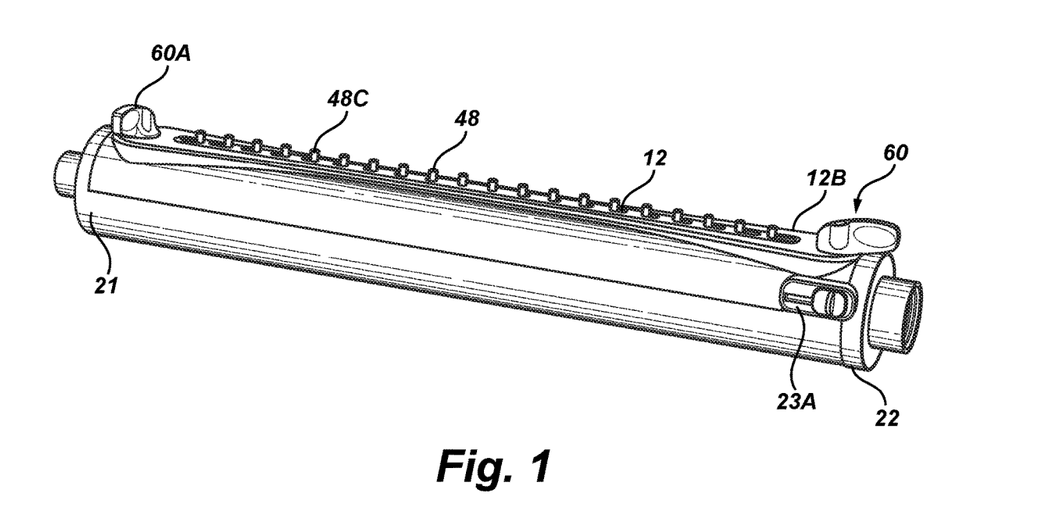
FIG. 1 shows a perspective view of an assembled sprinkler according to one embodiment of the invention.

FIG. 1 is a perspective view of an assembled, adjustable, oscillating sprinkler 1 in a state where the top assembly 10 is locked to the bottom assembly 20. The sprinkler can be rotated back and forth about the longitudinal axis by a water-operated drive (not described). Water (or any other fluid) from a water hose, for example, may be connected to fluid intake portion 22 (hose connector). The water is then forced through a plurality of nozzles N to the outside of the sprinkler 1 and onto an area to be watered.

Figure 2:
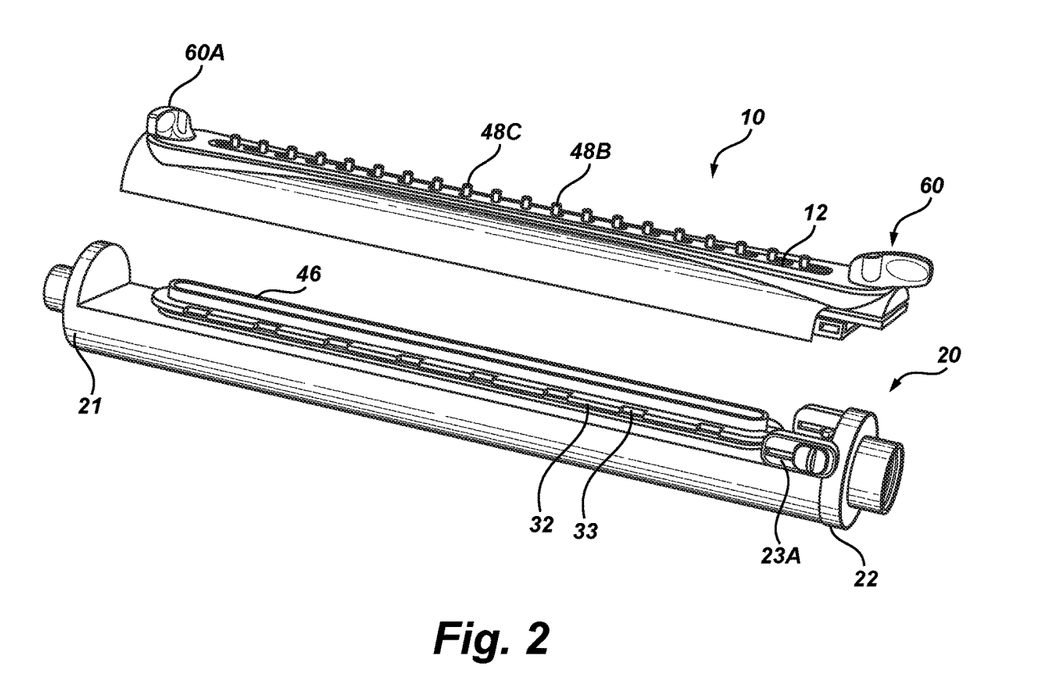
FIG. 2 shows a perspective view of the sprinkler shown in FIG. 1 in unlocked state with top assembly detached from bottom assembly.

FIG. 2 is a perspective view of the top assembly 10 detached from the bottom assembly. The locking mechanism is shown in the unlocked position (slider is to the right in FIG. 2 and to the left in FIG. 1). The nozzles N are located entirely outside the bottom assembly 20 in the detached state.

Figure 3:
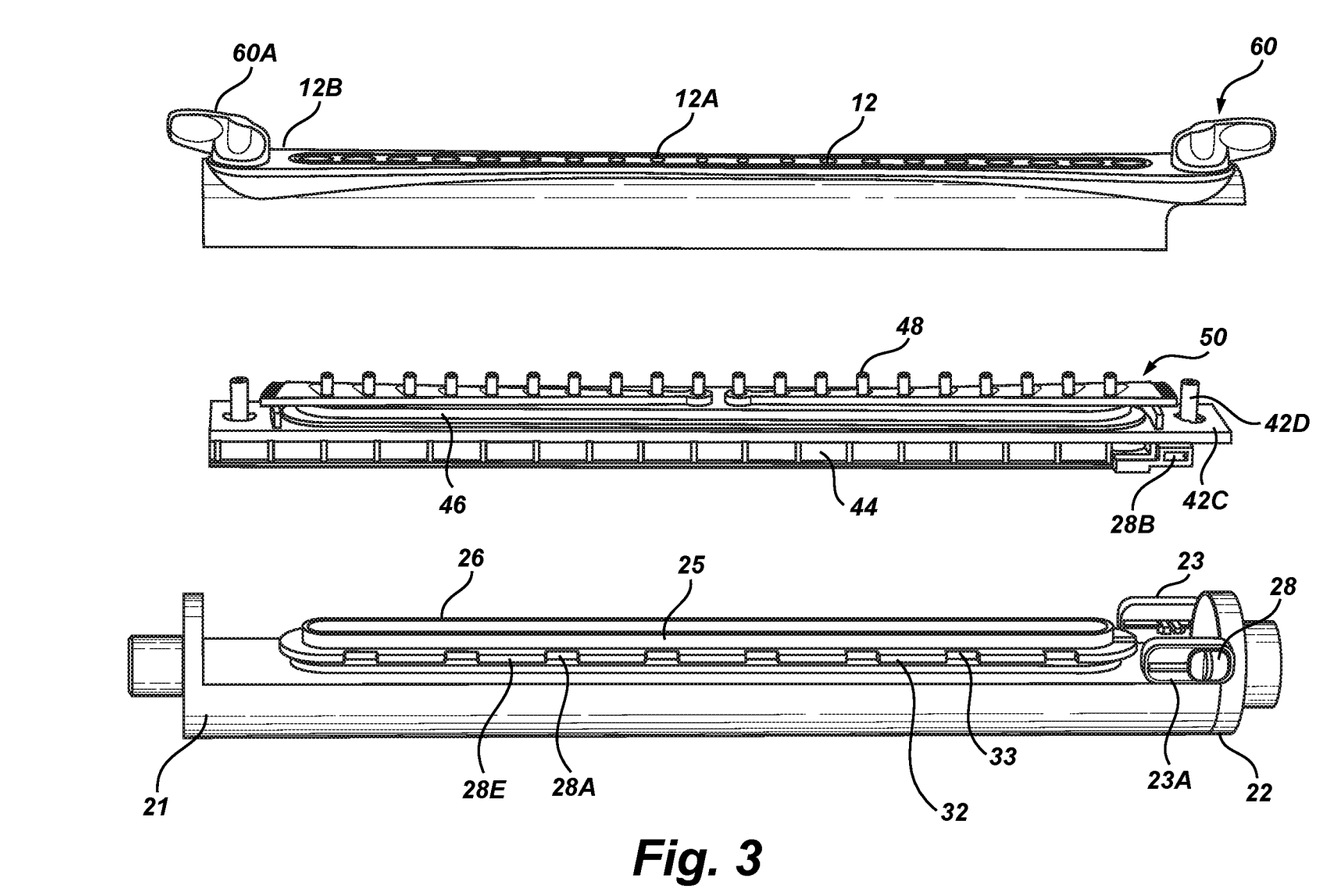
FIG. 3 shows a perspective partially exploded view of the sprinkler shown in FIGS. 1-2.

FIG. 3 is a perspective partially exploded view of the sprinkler 1 shown in FIGS. 1 and 2. FIG. 3 shows nozzle plate assembly 40 separated from the top assembly 10. In assembled state, the nozzle plate assembly is attached to the top assembly 10.

Figure 4:
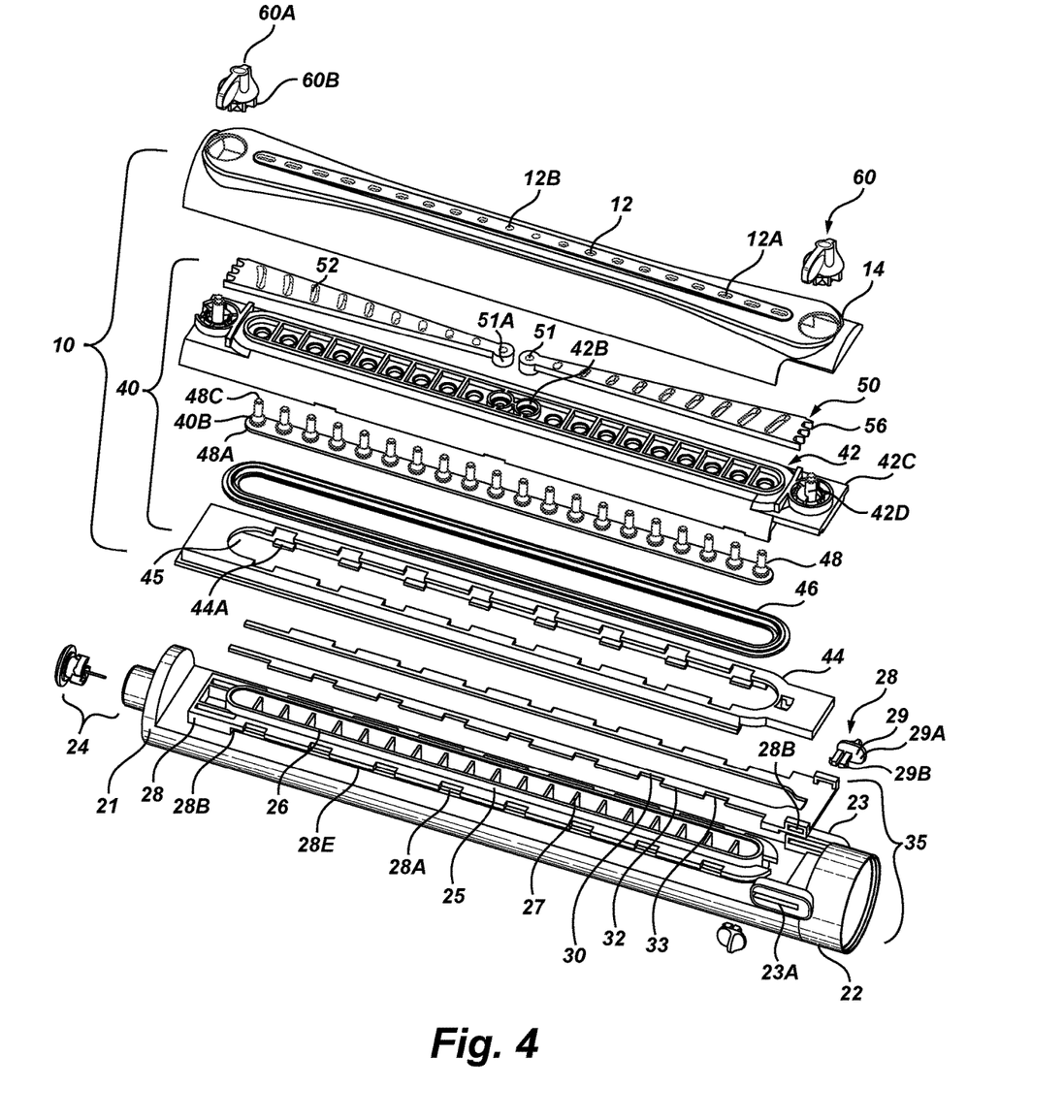
FIG. 4 is perspective exploded view of the sprinkler shown in FIGS. 1-3.

FIG. 4 is a perspective exploded view of the sprinkler 1 shown in FIGS. 1-3.

The bottom assembly 20 comprises a hollow body 21, water-operated drive (not shown or described), the fluid intake portion 22 (or water inlet and hose coupling) connected to one end of the hollow body 21 (e.g., adhered, welded, ultrasonic weld, etc.) so as to be connected with a hose (not shown) to an opposite end thereof, end seal portion 24 connected to the other end of the hollow body 21 in the lengthwise direction, and elongated opening 26 formed on a top surface of the hollow body. The elongated opening 26 allows water to flow outside the hollow body 21 portion of the bottom assembly 20 (e.g., flows from the water source, through the fluid intake portion 22, into the hollow body 21, through the nozzles N, and outside the top assembly 10 unit of the sprinkler 1).

According to one embodiment, the hollow body 21 comprises a plurality of vertical walls 27 (e.g., baffles) extending in a widthwise direction of the sprinkler 1 beneath an upper surface of the elongated opening 26. The vertical walls 27 provide increased rigidity and support and are arranged so as not to interfere with (or block) water flowing into inlet portions of the nozzles N. The vertical walls 27 may be individually provided in the space located between adjacent nozzle N inlets to provide additional support. Further, the vertical walls 27 prevent or restrain the flow of a fluid to locations away from the desired location (e.g., corresponding nozzle inlet 48a).

An upwardly extending flange (wall) 25 extends from an upper surface of the hollow body 21 and defines a circumference of the elongated opening 26 (e.g., provides further stability in an assembled state of the sprinkler 1). The vertical walls 27 do not extend outside a top surface of the flange 25. The flange 25 may be formed integrally with the hollow body 21.

A locking plate receiving unit 28 (receiving unit) is formed on or attached to an upper surface of the hollow body unit 21. The receiving unit 28 may be formed integral with the flange 25 extending therefrom as one unit or may be attached to the flange 25 (weld, adhesive, etc.). The receiving unit 28 extends in the lengthwise direction of the sprinkler 1 and outside the perimeter of the flange 25. A plurality of vertical channels 28a separated by tabs 28e are formed in a sidewall portion of the receiving unit 28 in the the lengthwise direction of the sprinkler 1. A lock plate stop portion 28b is formed on an opposite side of the receiving unit 28 from locking mechanism 35 in the lengthwise direction.

The vertical channels 28a are configured to accommodate corresponding tabs 32 formed on a locking plate 30 (described below) and legs formed on or with the bottom nozzle plate 44 (described below). A receiving unit slot 28d is formed between a lower portion of the receiving unit 28 and an upper surface of the hollow body 21 to accommodate the locking plate 30. The slot 28d may be formed in the receiving unit 28. The lock plate stop portion 28b is configured to limit (stop) the movement of the locking plate 30 in the lengthwise direction.

The locking plate 30 is configured to slide back-and-forth along the longitudinal axis of the sprinkler in the slot 28d. According to one embodiment, the locking plate 30 is a generally flat and U-shaped member extending in the lengthwise direction with an open end away from the locking mechanism 35 (described below). The locking plate could also be any other shape as long as it does not limit the locking plate's ability to slide in a horizontal direction. The locking plate 30 comprises a plurality of tabs 32 and grooves 33 arranged in the lengthwise direction of the locking plate 30. The tabs 32 and grooves 33 of the locking plate 30 are configured in number and dimension to correspond with the tabs 28e and channels 28a of the receiving unit 28, respectively. For example, in an unlocked position, the tabs 32 are aligned with the tabs 28e so that the vertical channels 28a are free from interference from the tabs 32. This allows a plurality of legs 44a of the bottom nozzle plate 44 (described below) to travel in the vertical direction free from interference from the locking plate 30 when the locking plate 30 is slid to unlock position (e.g., right side of sprinkler) and the unlock position determined when the grooves 33 of the locking plate 30 align with the grooves forming the vertical channels 28a in the receiving unit 28 (e.g., similar to a mechanical lock design).

Figures 5A, 5B:
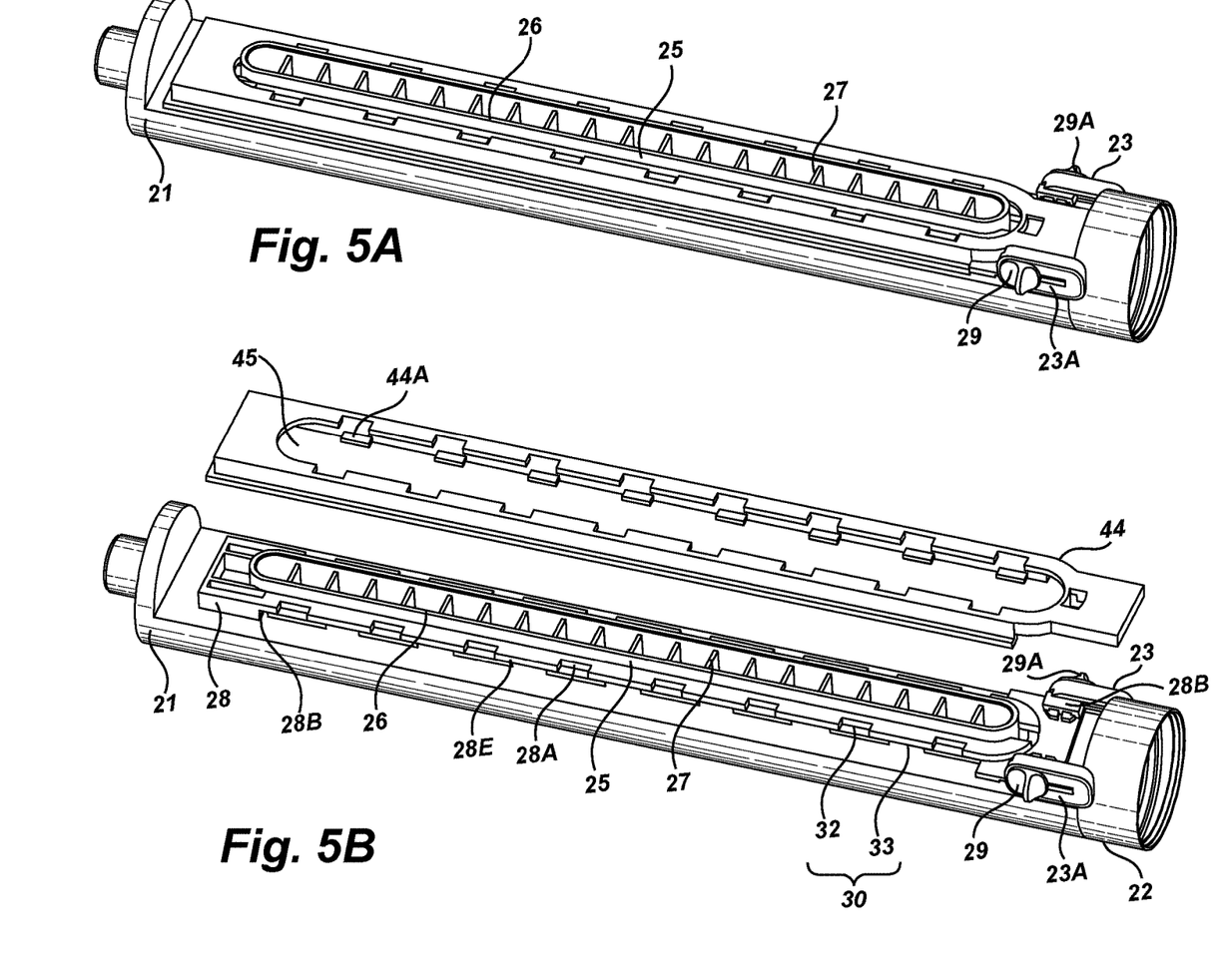
FIGS. 5A and 5B are sectional view of the sprinkler in a locked position.
Figure 6A:
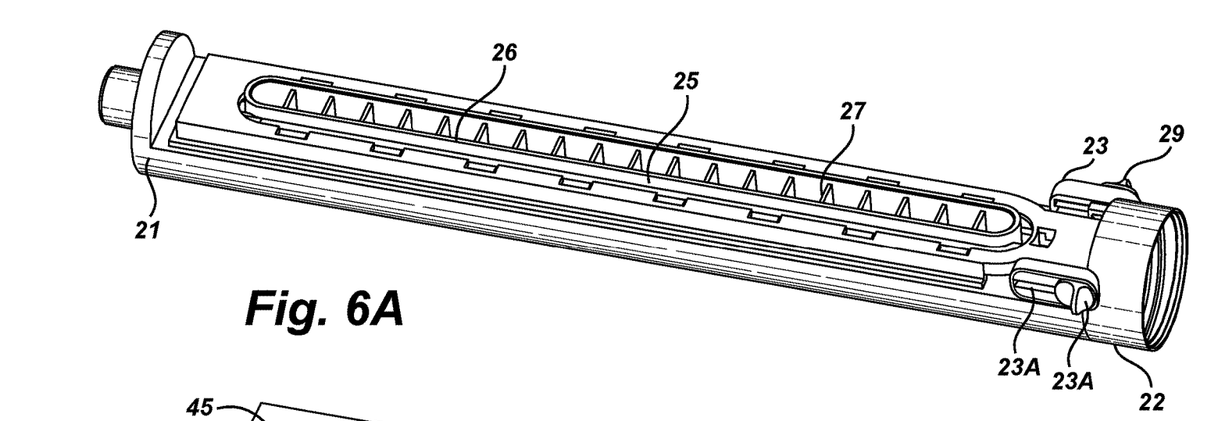
FIGS. 6A and 6B are sectional views of the sprinkler in an unlocked position.
Figure 6B:
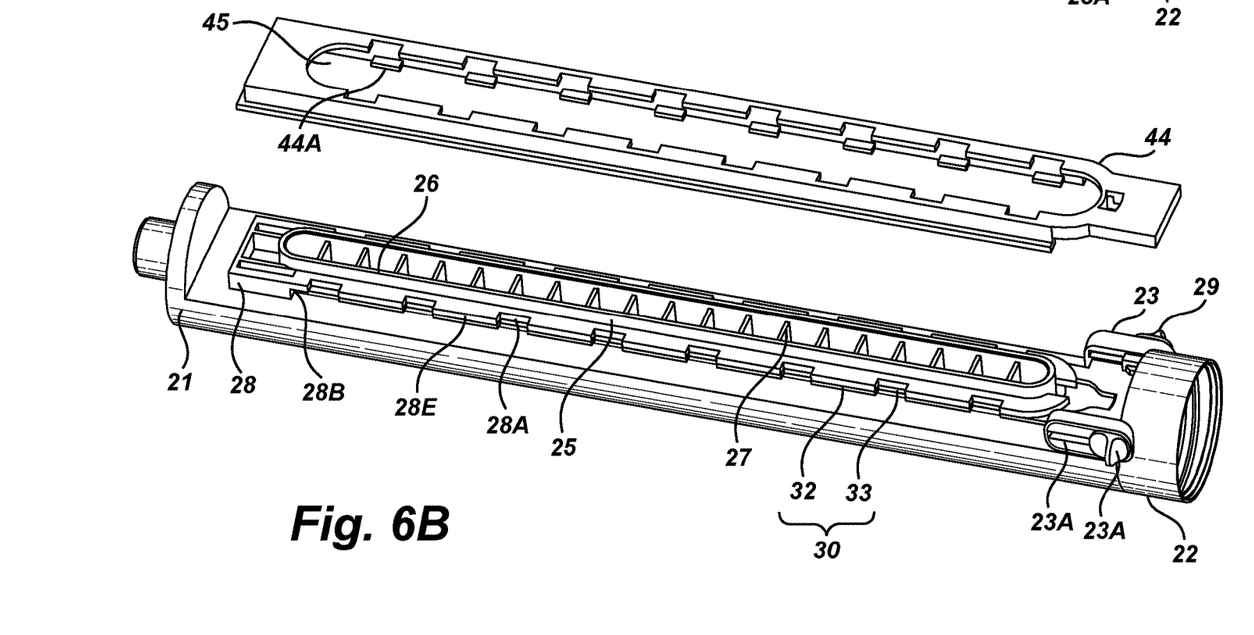

FIGS. 5 and 6 are sectional views of the sprinkler 1 in a locked and unlocked position, respectively. As shown in FIGS. 5A and 5B (e.g., locking plate 30 slid to left), the plurality (sixteen in this example) of protruded tabs 44a are positioned below the locking plate 30 in the locked position (e.g., locking plate slid to the left) and the tabs 32 are aligned with the vertical channels 28a. As shown in FIGS. 6A and 6B (e.g., locking plate 30 slid to right), the tabs 32 are positioned outside the vertical channels 28a (e.g., not aligned with the vertical channels 28a), thereby unlocking the bottom assembly 20 from the top assembly 10.

As described below, the plurality of legs 44a are arranged to align with the vertical channels, which allows for vertical displacement and subsequent removal of the top assembly 20 when the sprinkler 1 is in the unlocked position. The tabs 32 may be configured to be larger than the vertical channel 28a to ensure that when the locking plate 30 is in a locked position, the entire vertical channel 28a is covered by the locking plate 30.

The locking mechanism 35 is arranged on one side of the locking plate 30 and is configured to slide the locking plate 30 to lock and unlock the bottom assembly 20 from the top assembly 10.

According to one embodiment, shown in FIG. 4, the locking mechanism 35 includes one or more controllers 29 (e.g., slider units) arranged on one side of the sprinkler 1 and configured to move in a predetermined range in the lateral direction of the sprinkler 1. Each controller 29 includes a knob 29a (e.g., slider, tab, tab portion) and leg 29b (e.g., leg portion) extending laterally from the knob 29a. The leg 29b may be a pair of legs. The leg 29*b* (or pair of legs 29*b*) is smaller in diameter than the knob 29*a* and is configured to extend through an elongated opening 23*a* (or slot) formed in a bottom assembly slider unit receiving portion 23 and through a locking plate slider unit receiving portion 28*a* to engage with the locking plate 30. The elongated opening 23*a* and locking plate slider unit receiving portion 28*a* may be arranged adjacent to the fluid intake portion of the hollow body 21.

The knob 29*a* has a larger diameter than the elongated opening formed in the bottom assembly slider unit receiving portion 23*a* and is configured to allow a user to move or slide the locking plate 30 in the lateral direction to disengage the top assembly 10 (e.g., upper portion, top portion) from the bottom assembly 20 (e.g., lower portion, bottom portion) (described above). In operation, due to the above structure, when a user slides the knob(s) 29 to the right (e.g., towards the hose attachment end in this embodiment), the locking plate 30 simultaneously slides to the right (e.g., via mechanical connection) and unlocks the top assembly combination from the bottom assembly 20 via disconnection of bottom nozzle plate 44 from the lower assembly 20 (e.g., locking mechanism 35 described above).

The top assembly 10 includes the nozzle plate assembly 40, a plurality of spaced apart guide openings 12 formed on a top surface, and a control member receiving opening 14 formed on each end of a top surface of the top assembly 10. The guide openings 12 are substantially parallel to the longitudinal axis of the sprinkler 1. Each of the plurality of guide openings 12 is designed to accommodate the passage of a nozzle N outside the sprinkler. Several of the guide openings 12 may be elongated in shape. In one embodiment, the guide openings 12 include a plurality of elongated guide openings 12*a* and plurality of circular guide openings 12*b*. In one embodiment, the centermost two guide openings 12 are the circular guide openings 12*b* and the remaining guide openings 12 are elongated guide openings 12*a* that are configured to become more elongated in shape as they extend towards the ends of the top assembly, The nozzle plate assembly 40 is attached to the top assembly 10. In one embodiment, the nozzle plate assembly 40 is attached to a bottom side of the top assembly 10. Attachment may be performed in a variety of manners, including welding, adhesive, mechanical fasteners, snap-engagement, etc. The nozzle plate assembly 40 and the top assembly 10 are removable together as one unit from the bottom assembly 20 by operation of the locking mechanism 35 (described above).

In one embodiment, the nozzle plate assembly 40 includes two angle plates 50, top nozzle plate 42, the bottom nozzle plate 44 attached to the top nozzle plate 42, sealing gasket 46 sandwiched between the top nozzle plate 42 and the bottom nozzle plate 44, and nozzle strip 48. Each of these elements extends in the longitudinal direction of the sprinkler 1.

The bottom nozzle plate 44 includes an opening 45 formed therein having similar dimension as the elongated opening 26 formed in the bottom assembly 20. The opening 45 is configured to align with the elongated opening 26 in the assembled and connected state. The bottom nozzle plate 44 is removably connected to the bottom assembly 20 by operation of the locking mechanism 35 (described above). The nozzle strip 48 can be removed from the nozzle plate assembly 40 through the opening 45 when the top assembly 10 is disconnected from the bottom assembly 20.

In one embodiment, the bottom nozzle plate 44 includes a plurality of tabs 44*a* formed on one side thereof and configured to engage and disengage with the plurality of vertical channels 28*a* by operation of the locking mechanism 35 (described above). The opposite (upper) side of the bottom nozzle plate is attached to the top nozzle plate 42 (e.g., adhered, welded, ultrasonic weld, etc.).

The nozzle strip 48 is a flexible strip (preferably made of rubber) formed with a row of upwardly projecting nozzles N each corresponding and aligned with inlets provided on the top nozzle plate 42, angle plates 50 and top assembly 10. The nozzle strip 48 and nozzles N may be formed integrally from a single piece of material. They may be formed from thermoplastic elastomers (TPE) or thermoplastic rubber (TPR). It is known that in other embodiments, different materials that allow bending (flexibility) of the nozzles N may be used. Thus, the nozzles N have a resilient bending characteristic (e.g., able to bend and spring or revert back to a default shape or position). As described herein, the bending capability of the nozzles N enables them to be controllably bent/moved into one or more desired positions and eliminates the need for complicated mechanisms that would otherwise be used to cause the nozzles N to move if they were constructed from a rigid material.

Each of the nozzles N is formed with a nozzle inlet 48*a*, nozzle cylindrical portion 48*b*, and a nozzle outlet 48*c*. The length (or height) of the nozzles N is chosen to just extend past the guide openings 12 formed in the top assembly 10. However, it is known that many different structural configurations for the nozzles N may be used. For example, the width for the nozzle cylindrical portion 48*b* may be variable and correspond with a conical shape to result in a desired nozzle fluid emission property. For example, one or more protrusions may be inserted into the interior part of one or more nozzles N (e.g., ribs, splines, etc) to impart a desired nozzle fluid emission property (e.g., laminar emission flow, rotation of fluid emitted, etc.). For example, the length of one or more of the nozzles N may be selected to be below the guide opening 12 formed in the top assembly 10. Accordingly, one of ordinary skill in the art will appreciate the wide configurability of the structure of the jets.

The nozzles N may be all variable nozzles $N_v$, or may include central nozzle(s) that are fixed nozzles $N_f$ (e.g., fixed direction nozzles) in an upright position, e.g., approximately 90 degrees from the longitudinal axis. This structure delivers a predetermined vertical projection of water. Each of the remaining nozzles on the nozzle strip 48 are variable nozzles $N_v$, each of which may be adjustably tilted outward by contact with a sidewall of angle plate grooves 52 of angle plate 50 (further described below). According to one embodiment, each of the angle plate grooves 52 is formed with an incrementally increasing angle with respect to a lengthwise centerline of the angle plate 50 so that as each of the variable (adjustable) nozzles $N_v$ is tilted by the sidewall of the angle plate groove 52, the sidewall remains substantially parallel to a cylindrical portion of the corresponding nozzle $N_v$. Variable nozzles $N_v$ can deliver an outwardly tilted projection of water.

When operatively positioned with respect to the top assembly 10 and the top nozzle plate 42, nozzles N near the center of nozzle strip 48 project upward in a substantially vertical direction, while the remaining nozzles N toward the outer end of the nozzle strip 48 are progressively flared outwards. The nozzle strip 48 is insertable underneath the top nozzle plate 42 such that the nozzles N correspond and align with apertures 43 (openings) formed in the top nozzle plate 42. In this regard, each nozzle N of nozzle strip 48 extends up and through one the apertures 43.

Coupling of the nozzle strip 48 to the bottom of the top nozzle plate 42 may be performed in any of a variety of manners, including simply removably press fit with nozzle N pulled through the apertures 43 formed in the top nozzle plate to create a tight fit and wherein, during operation, water pressure through the nozzles N maintain the press fit. In another embodiment, bottom surface of the top nozzle plate 42 may include structural features that enable the coupling (e.g., snap-engagement, etc.). In another embodiment, one or more fasteners may be used. In any of these configurations, coupling between the nozzle strip 48 and the top nozzle assembly 12 may be performed in a fluid tight manner or substantially fluid tight manner so that fluid provided to the hollow body 21 of the bottom assembly 20 can be directed through each of the nozzles N as opposed to a space between the top nozzle plate 42 and the nozzle strip.

The bottom nozzle plate 44 engages and disengages with the bottom assembly 20 by operation of the locking mechanism 35 (described above). According to one embodiment, the angle plates 50 is a pair of angle plates 50 (described below) arranged on top of the nozzle plate assembly 40 in a space formed between the top assembly 10 and the top nozzle plate 42. The pair of angle plates 50 are arranged and configured to pivot along a single axis (e.g., not around a portion of the circumference of the bottom nozzle plate, etc.) The pair of angle plates 50 extends in a single row in a lengthwise direction of the sprinkler.

Each angle plate 50 is an elongated flat plate having a plurality of substantially transverse (lateral) spaced apart grooves 52 extending across the angle plate 50. In one embodiment, the grooves 52 increasingly slant outward with respect to a middle portion of the angle plate 50. The angle plate 50 tapers inward in the embodiment shown in FIG. 4. Each angle plate 50 is configured to individually move relative to a substantially fixed top assembly 10 (e.g., pivots laterally). The angle plate 50 may be pivotally connected to a top surface of the top nozzle plate 42 and located in a space formed between the top assembly 10 and the top nozzle plate 42. A bottom portion of the angle plate 50 rests against a top portion of the top nozzle plate 42.

A pivot hole 51 is formed on one end of the angle plate 50 (e.g., tapered end). A bushing 51a extends downward from the pivot hole 51 and includes a shaft 51b aligned with the pivot hole 51. The bushing 51a aligns with and is inserted into a bushing through hole 42b formed on a middle portion of the top nozzle plate 42. The bushing 51a is integrally formed on the angle plate 50. The bushing 51a is a pivot point for the angle plate 50. The shaft 51b is designed to accommodate a cylindrical portion of a nozzle N of the nozzle strip 48. The bushing through hole 42b has a slightly larger diameter than the bushing 51a to allow for rotational movement of the bushing 51a inside the bushing through hole 42b. The bushing through hole 42b having a larger internal diameter than an outside diameter of the bushing 51a to allow for rotational movement of the angle plate 50. The shaft 51b may correspond to the fixed vertical nozzle $N_f$ and a diameter of the shaft hole is approximately equal to an outside diameter of the nozzle N (e.g., limit lateral movement of nozzle).

Figure 7:
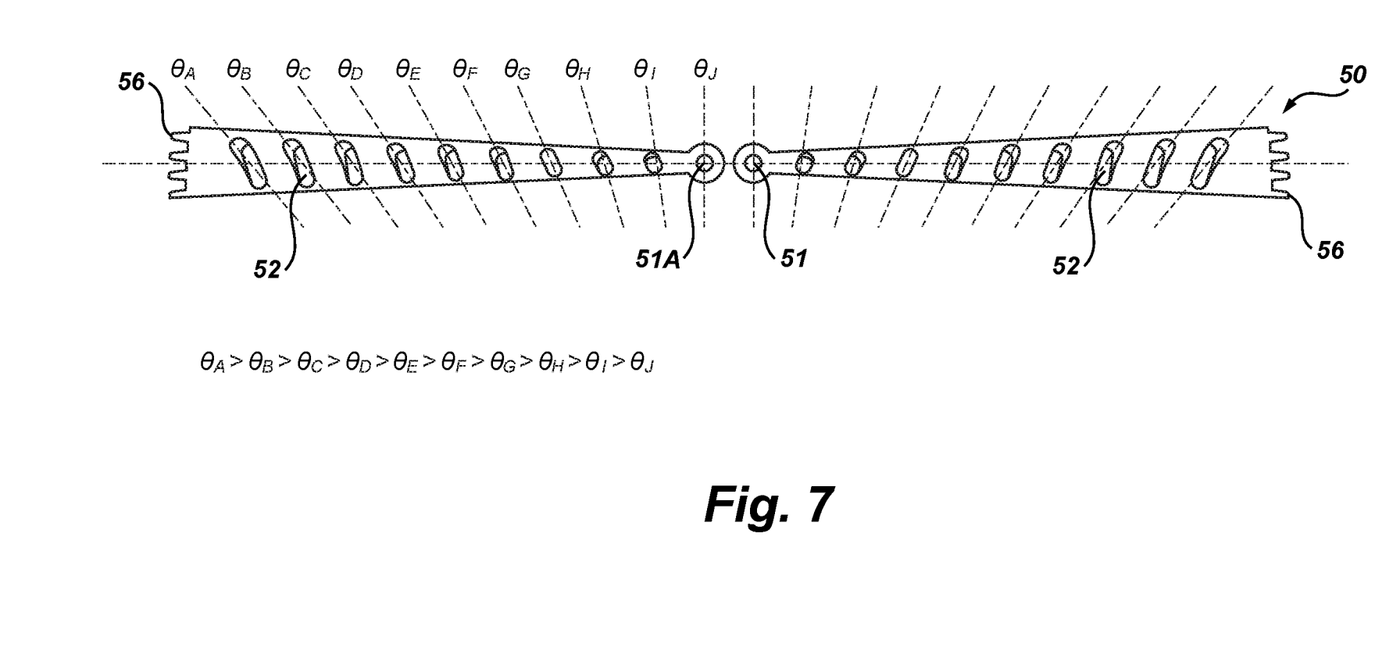
FIG. 7 is a top view of one embodiment of an angle plate, showing angles of the grooves of the angle plate.

The number of grooves 52 preferably corresponds to the number of variable nozzles $N_v$. The grooves 52 are generally oblique to the longitudinal direction of the angle plate 50. The width of the grooves 52 is approximately equal to the outside diameter of the nozzle N. As shown in FIG. 7, the grooves 52 incrementally become less parallel with the pivot hole 53 as the grooves 52 get further away from the pivot hole 53. This progressive increasing of the difference in the angles of the grooves 52 provides for a consistent and uniform sprinkler spray pattern. As variable nozzles $N_v$ are manipulated by grooves 52, the variable nozzles point in a more outward direction the further away the grooves 52 are located from the center of the angle plate 50.

In the assembled state of the sprinkler 1, the fixed vertical nozzles $N_f$ project outside the sprinkler 1 via passage through the corresponding pivot holes 51 and guide openings 12a and the variable nozzles $N_v$ project outside the sprinkler 1 via passage through the corresponding grooves 52 and the elongated guide openings 12b.

In one embodiment, the top assembly 10 and the angle plate 50 are superimposed so that in an assembled state, the nozzles N extend outside the top assembly 10 and away from the sprinkler 1. The overlapping of the angle plate grooves 52 and the guide openings 12 defines an intersection area, which provides a protruding space for the nozzles N. The shape of the angle plate grooves 52 determines the tilting position of the variable nozzles $N_v$, and therefore the sprinkling pattern. For example, if a control member 60 (described below) is in an extreme rotational position, the resulting intersection area will tilt the nozzles N outward and deliver water outward.

In one embodiment, the sealing gasket 46 is arranged in a space formed between the top nozzle plate 42 and the bottom nozzle plate 44 and is configured to surround the nozzle strip 48 to improve sealing properties of the top assembly 10 and nozzle plate assembly 40.

In one embodiment, the top nozzle plate 42 includes a control member receiving unit 42c located on opposing ends, in the lengthwise direction, of the top nozzle plate 42. Each of the receiving units 42c is aligned with a corresponding control member receiving opening 14 of the top assembly 10. The control member receiving unit 42c is arranged in a position that is outside of the apertures formed in the top nozzle plate 42. The control member receiving unit 42c is designed to engage with a control member 60 and enable rotational movement of the control member 60. The control member 60 is attached to a shaft 42d extending upward from the receiving unit 42c and towards and through the control member receiving opening 14 of the top assembly 10.

The number of through holes formed in the top nozzle plate 42 preferably corresponds to the number of nozzles N. However, one through hole may also correspond to more than one nozzle. A through hole diameter may be approximately equal to the outside diameter of a nozzle outlet $N_o$.

In one embodiment, the control member 60 is a knob 60 having a projecting portion 60a arranged outside of the control member receiving opening 14 and a gear portion 60b arranged at a lower end of the knob 60. The knob 60 is configured to rotate around the shaft 42d and thereby rotate the gear portion 60b by moving or rotating the projecting portion 60a. The gear portion 60b includes indentation (teeth) formed on an outer surface thereof that correspond to and engage angle plate gear portion 56 of the angle plate 50. The angle plate gear portion 56 includes indentations (teeth) formed on an outside end surface of the angle plate 50 (e.g., opposite end from the round pivot hole 53a, 53b.) The teeth are cut of such form, size, and spacing that they mesh with the teeth in the gear portion 60b to transmit or receive force and motion.

In operation, due to the above structure, a user sets a desired sprinkler pattern by adjusting the position of projecting portion 60a of the control member 60. By turning the projecting portion 60a of control member 60, the gear portion 60b of control member 60 simultaneously engages with the gear portion 56 of the angle plate 50 to drive the angle plate 50 in a first direction. As a result, the intersection area defined by the resulting opening formed by the overlap between the angle plate grooves 52 and the guide openings 12, will change the tilt angle of the nozzles N and therefore change the area where water is delivered to the outside (lawn).

Figure 8A:
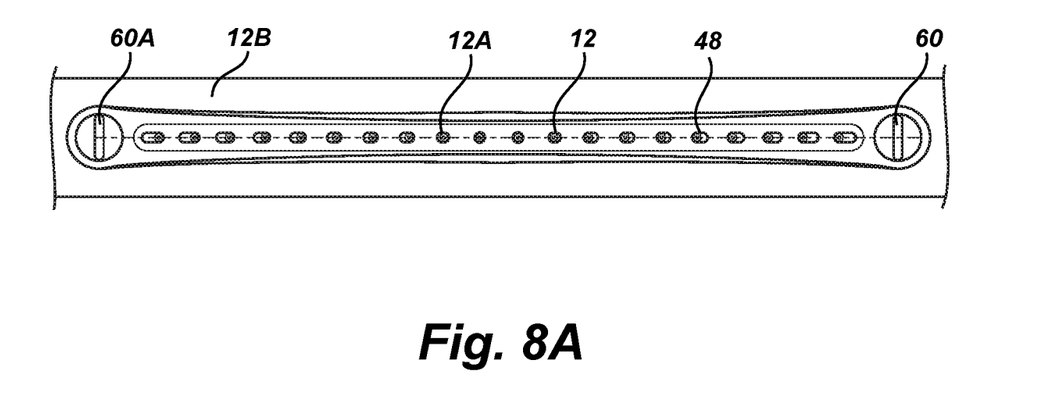
FIGS. 8A-C show an assembled view of a first setting, second setting, and third setting, respectively of the sprinkler of FIG. 1.
Figure 8B:
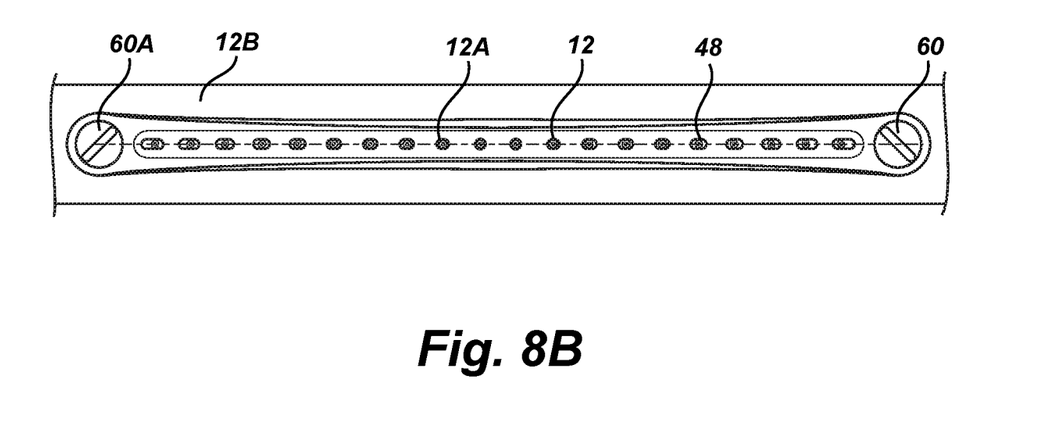
Figure 8C:
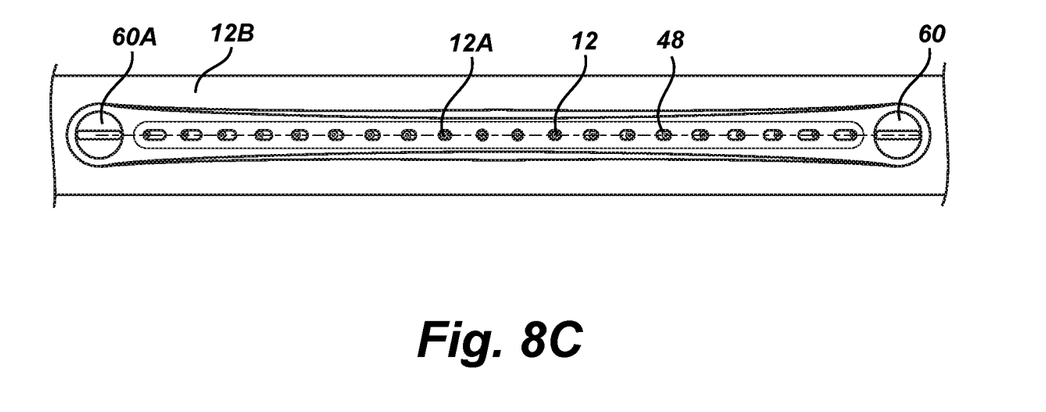

FIGS. 8A-C show an assembled view of three different settings of the control member 60 of sprinkler 1. In FIG. 8A, the control member 60 is not adjusted. As a result, variable nozzles $N_v$ point in a substantially vertical direction. In FIG. 8B, the control member is partially adjusted. As a result, variable nozzles $N_v$ point in a somewhat outward direction. As the nozzles N are positioned further away from the center of the angle plate 50, they become increasingly angled with respect to the center fixed nozzles $N_f$. In FIG. 8C, the control member 60 is fully adjusted. As a result, variable nozzles $N_v$ are fully tilted outward, and the sprinkling pattern is set to its maximum coverage.

Figure 9A:
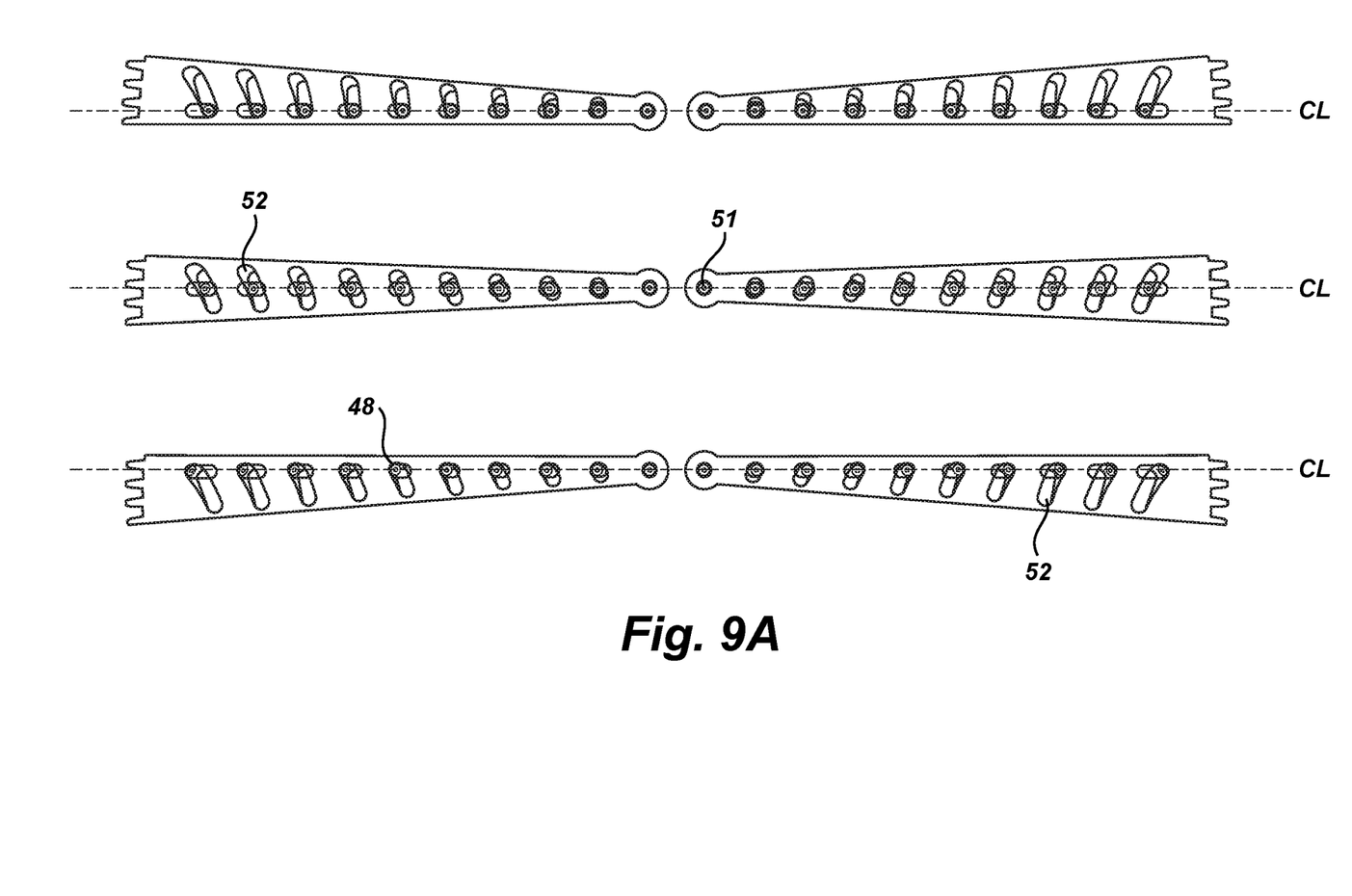
FIGS. 9A and 9B show a sectional view of the different settings of the angle plate and the corresponding watering pattern respectively, of the sprinkler of FIG. 1.
Figure 9B:
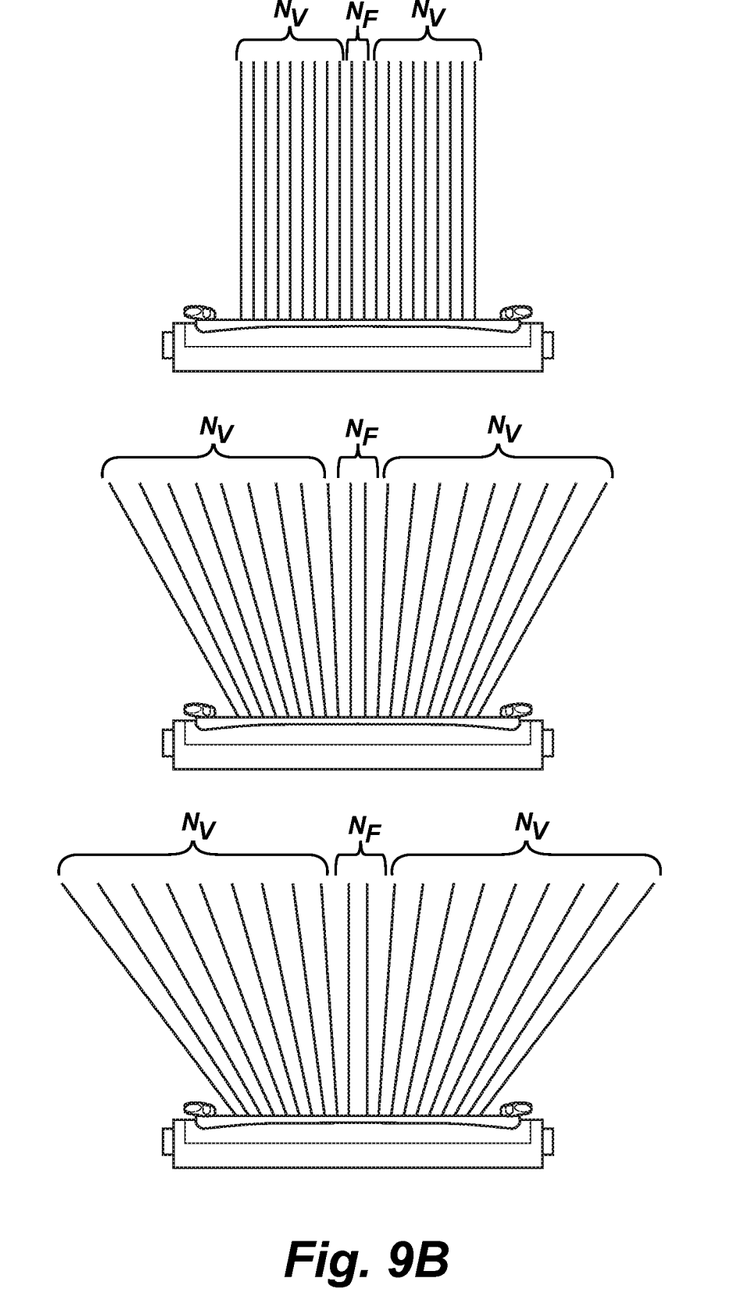

FIGS. 9A-B show the angle of the fixed nozzles $N_f$, the angle of the variable nozzles $N_v$, and the resulting sprinkling pattern, respectively. As illustrated in FIG. 9B, the inner variable nozzles $N_v$ tilt less than the outer variable nozzles $N_v$ so that a uniform sprinkling pattern (e.g., fan-like) can be achieved. As illustrated in FIG. 9B, the fixed nozzles $N_f$ always point in a fixed direction, in this case substantially vertical due to the intersection area.

Figure 10A:
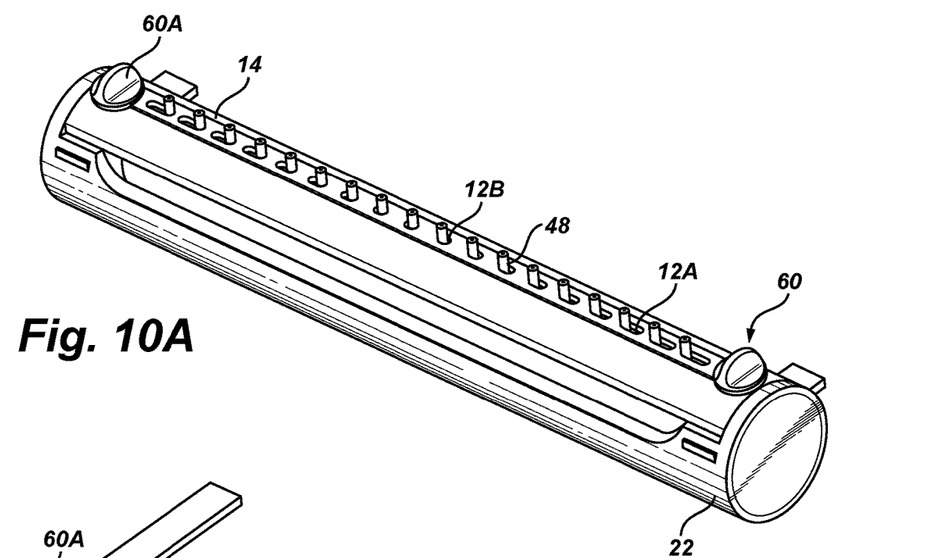
FIGS. 10A and 10B show a perspective view of an assembled sprinkler according to another embodiment of the invention.
Figure 10B:
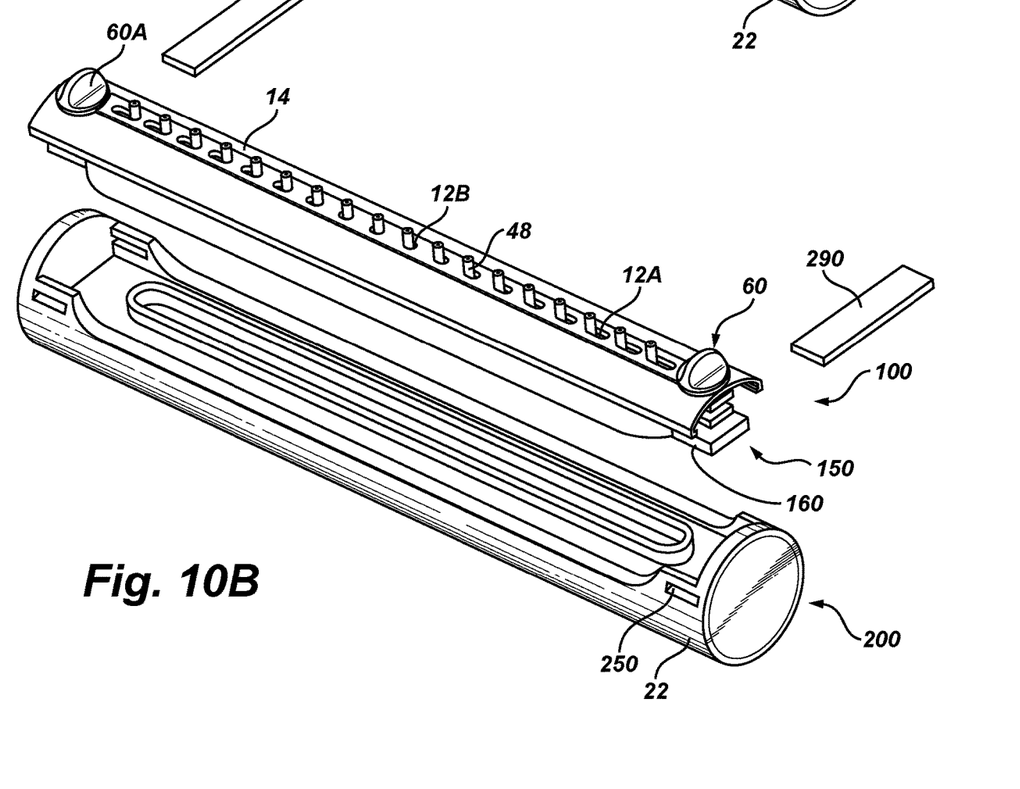

According to another embodiment, illustrated in FIGS. 10A and 10B, a top assembly 100 is disengaged from a bottom assembly 200 by a slideable locking member 280. The locking member 280 may be a pair of tabs 290, each one of the pair of tabs 290 arranged on an opposing longitudinal end of the sprinkler and extending in a widthwise direction of the sprinkler. The tabs 290 may be arranged to extend through a tab receiving slot 250 located on a surface integral with the bottom assembly 200 in a detached state or on a surface integral with the top assembly 100 in a detached state. In the embodiment illustrated in FIGS. 10A and 10B, the tab receiving slot 250 is integral with the bottom assembly 200 and the top assembly 100 comprises a tab receiving (locking) portion 150 arranged adjacent the tab receiving slot 250. The tab receiving portion 150 comprises a projecting plate 160 positioned beneath the tab 290 in the locked position. The tab 290 length allows for one or both ends of the tab 290 (e.g., 10-25% of overall length of tab) to project outside the tab receiving slot 250 in a direction away from the sprinkler to allow a user to slide the tab with his/her fingers.

The embodiment illustrated in FIGS. 10A and 10B show the tab receiving slot 250 formed on the bottom assembly 200 and the tabs 290 completely removed from the tab receiving slot 250. The top assembly 100 includes a tab receiving portion 150, whereas a lower surface of the tab 290 contacts an upper surface of the tab receiving portion in the locked position to prevent the removal of the top assembly 100 from the bottom assembly (e.g., lock in place). The surface of the tab receiving portion 150 also enables rigidity and smooth slide of the tab 290 outside the sprinkler. In operation, a user pulls or pushes the tabs 290 entirely through the tab receiving slots 250 to disengage the top assembly 100 from the bottom assembly 200, which allows access to the nozzle strip 48 arranged within the nozzle plate assembly 40.

According to another embodiment, the plurality of tabs 290 may be formed with an engaging portion 290a on an inside end (end that does not extend outside the sprinkler). The engaging portion 290a may be a bump or a lip that is larger than the opening size of the tab receiving slot 250 to prevent complete removal of the tab 290 from the sprinkler, while allowing for removal of the top assembly 100 from the bottom assembly 200 with tabs still in contact with the bottom assembly 200. This allows access to the nozzle strip 48 arranged within the nozzle plate assembly 40 without losing the tabs 290.

Figure 11A:
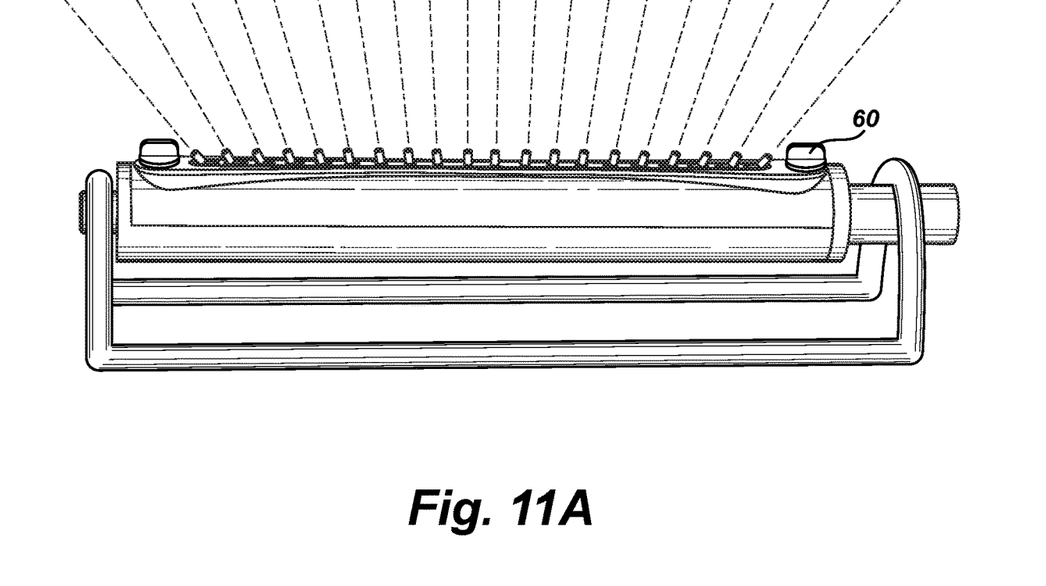
FIGS. 11A-C shows a side view of an assembled sprinkler according to one embodiment of the invention and sectional views showing.
Figure 11B:
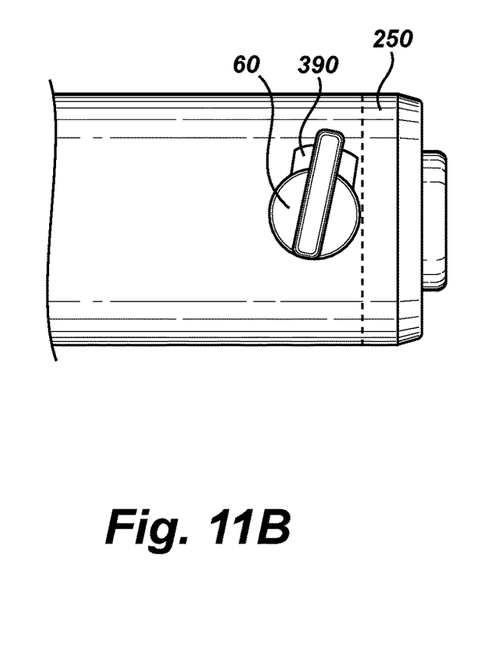
Figure 11C:
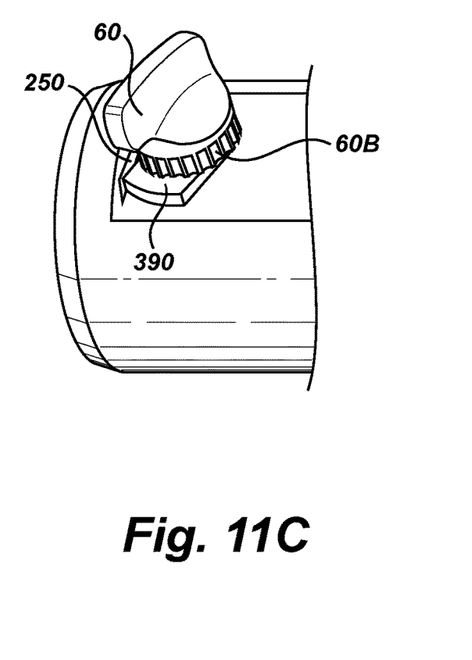

According to another embodiment shown in FIGS. 11A-C, a top assembly 100 is disengaged from a bottom assembly 200 by a rotatable locking member 380. The locking member 380 is the control member 60 described above with a locking element 390 attached to a bottom surface of the gear portion 60b. One end of the locking element 390 extends outside an area defined by the gear portion 60b and projects away from the angle plate 50 and towards the end of the sprinkler. The bottom assembly 200 includes a locking element receiving slot 350 formed therein. The locking element receiving slot 350 is configured to receive the locking element 390. The height of the receiving slot 350 is slightly larger than the height of the locking element 390. The rotatable locking member is designed to rotate a predetermined number of degrees, e.g., 90-270 degrees, preferably 180 degrees.

In operation, as shown in FIGS. 11A-B, a user turns the control knob 60a of the locking member 380 past a predetermined position (e.g., 90 degrees) and the locking element 390 simultaneously turns and moves to a position outside the locking element receiving slot 350 to unlock the top assembly 100 from the bottom assembly 200 and allow access to the nozzle strip for removal from the top assembly 100.

Figure 12A:
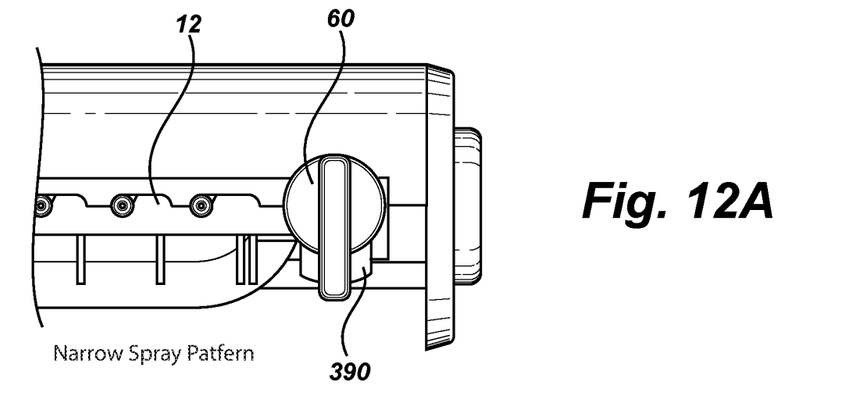
FIGS. 12A-C illustrates an example of setting positions for a control knob.
Figure 12B:
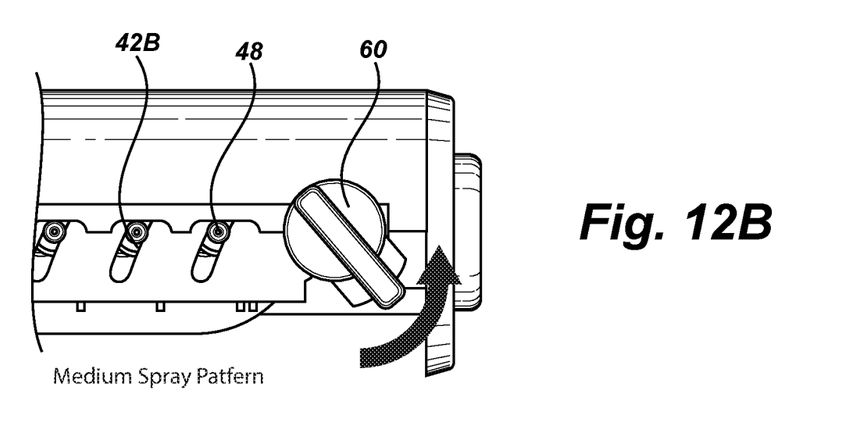
Figure 12C:
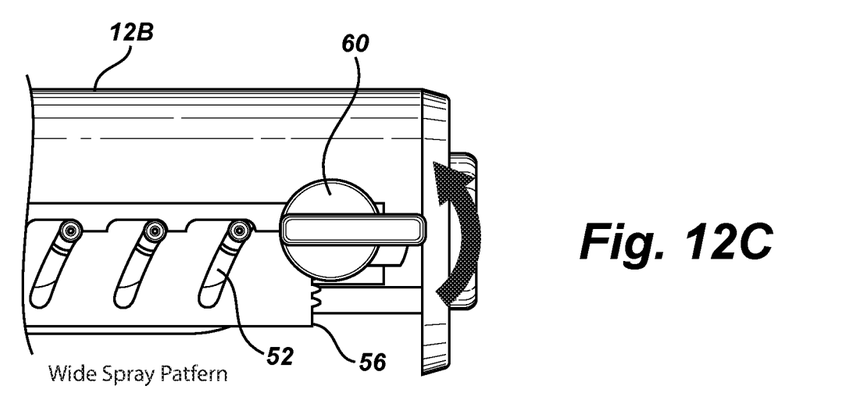

In operation, as shown in FIGS. 12A-C, if the user turns the control knob 60a within an allowable range of motion less than 90 degrees in this embodiment, the range of spray pattern is adjusted (e.g., narrow, medium, wide spray patterns) due to engagement of the gear portion 60b with the angle plate gear portion 56 of the angle plate 50.

One skilled in the art will understand that the embodiments of the present invention as shown in the drawings and described above is exemplary only and not intended to be limiting.

The embodiments have been shown and described for the purposes of illustrating the functional and structural principles of the present invention and is subject to change without departure from such principles. Therefore, this invention includes all modifications encompassed within the spirit and scope of the following claims.

We claim:

1. A sprinkling apparatus comprising:
   a body comprising:
   an upper assembly unit comprising a nozzle strip and a lower nozzle plate; and
   a lower assembly unit comprising a hollow body, a locking plate, and a controller connected to the locking plate, wherein
   the locking plate is configured to move in a lengthwise direction,
   the locking plate comprises a locking plate tab and a locking plate groove,
   the lower nozzle plate comprises a nozzle plate tab,
   the hollow body comprises a vertical channel formed therein, the vertical channel configured to accommodate the locking plate tab in a first position,
   the nozzle plate tab is arranged beneath the locking plate tab in the first position,
   the locking plate tab is arranged outside the vertical channel in a second position,
   the first position is a lock position and the second position an unlock position, the controller is connected to one side of the locking plate and is configured to move the locking plate to the first position and to the second position, and the lower unit assembly is designed to detach from the upper unit assembly when the locking plate is in the second position.

2. The sprinkling apparatus of claim 1, wherein the lower unit assembly further comprises a locking plate receiving portion attached to or integrated with a top of the hollow body and extending in a lengthwise direction of the sprinkling apparatus.

3. The sprinkling apparatus of claim 2, wherein the locking plate receiving portion comprises a slot extending in the lengthwise direction of the sprinkling apparatus, the slot configured to accommodate the locking plate in the first and second positions.

4. The sprinkling apparatus of claim 1, wherein the nozzle plate tab is a plurality of nozzle plate tabs,
the vertical channel is a plurality of vertical channels,
the locking plate tab is a plurality of locking plate tabs,
the locking plate groove is a plurality of locking plate grooves,
the plurality of locking plate tabs being arranged in the plurality of vertical channels in the first position, and
the plurality of nozzle plate tabs being arranged beneath the plurality of locking plate tabs in the first position.

5. The sprinkling apparatus of claim 4, wherein each of the plurality of locking plate tabs correspond to each of the plurality of vertical channels.

6. The sprinkling apparatus of claim 1, wherein the locking plate is U-shaped, and the controller is arranged on a closed end of the locking member.

7. The sprinkling apparatus of claim 1, wherein the lower unit assembly comprises an elongated opening formed therein, the elongated opening configured to enable lateral movement of the controller therein,
the locking plate comprises an opening formed therein,
the controller comprises a tab and leg extending laterally from the tab, the tab arranged outside the sprinkling apparatus and the leg arranged inside the sprinkling apparatus, and
the leg extends through both the elongated opening formed in the lower portion and the opening formed in the locking plate to connect the controller to the locking plate.

8. The sprinkling apparatus of claim 4, wherein the plurality of channels formed in the hollow body are separated by tabs formed therein, and in the second position,
the plurality of locking plate tabs are aligned with the plurality of tabs formed in the hollow body, and the plurality of vertical channels are free of the plurality of locking plate tabs, thereby allowing the plurality of nozzle plate tabs to travel in a vertical direction free of interference from the locking plate when the locking plate is moved to the second position by the controller.

9. The sprinkling apparatus of claim 8, wherein in the second position, the plurality of locking plate grooves align with the plurality of vertical channels.

10. The sprinkling apparatus of claim 1, further comprising:

an opening formed in a bottom of the upper unit assembly, wherein
the nozzle strip arranged on the upper unit assembly is accessible via the opening when the locking plate is in the second position and the upper unit assembly is detached from the lower unit assembly.

11. The sprinkling apparatus of claim 1, further comprising:

an opening formed in a bottom of the upper unit assembly, wherein
the nozzle strip arranged on the upper unit assembly is removable via the opening when the locking plate is in the second position and the upper unit assembly is detached from the lower unit assembly.

\* \* \* \* \*